United States Patent [19]
Ocvirk et al.

[11] Patent Number: 4,795,000
[45] Date of Patent: Jan. 3, 1989

[54] CRUISE CONTROL DEVICE FOR AUTOMOTIVE VEHICLES

[75] Inventors: Norbert Ocvirk, Offenbach; Holger V. Hayn, Frankfurt am Main; Joachim Maas, Darmstadt, all of Fed. Rep. of Germany

[73] Assignee: Alfred Teves GmbH, Frankfurt am Main, Fed. Rep. of Germany

[21] Appl. No.: 54,403

[22] Filed: May 26, 1987

[30] Foreign Application Priority Data

May 26, 1986 [DE] Fed. Rep. of Germany ....... 3617630

[51] Int. Cl.⁴ ............................................. B60K 31/10
[52] U.S. Cl. ................................... 180/176; 180/197; 123/342
[58] Field of Search .............. 180/197, 175, 176, 177, 180/1; 123/342, 350, 396, 398, 401, 349; 92/29; 91/41

[56] References Cited

U.S. PATENT DOCUMENTS

2,139,832 12/1938 Leibing ............................... 123/342
4,561,517 12/1985 Hilton et al. ......................... 180/175

Primary Examiner—David M. Mitchell
Assistant Examiner—Richard Camby
Attorney, Agent, or Firm—James B. Raden

[57] ABSTRACT

A cruise control device for automotive vehicles is disclosed including an actual speed sensor which actuates, by way of a control circuit, the throttle valve of the vehicle motor for keeping the vehicle speed constant. The accelerator pedal can be overridden by a hydraulic control element. A piston rod is arranged inside a stepped piston in an axial through bore and is connected to the throttle valve. The piston rod can be coupled through a ball-type locking mechanism with the stepped piston which is pressurized by the control circuit in such a way that the piston rod is driven by the stepped piston and displaces the throttle valve in an opening direction against the force acting upon the accelerator pedal.

21 Claims, 1 Drawing Sheet

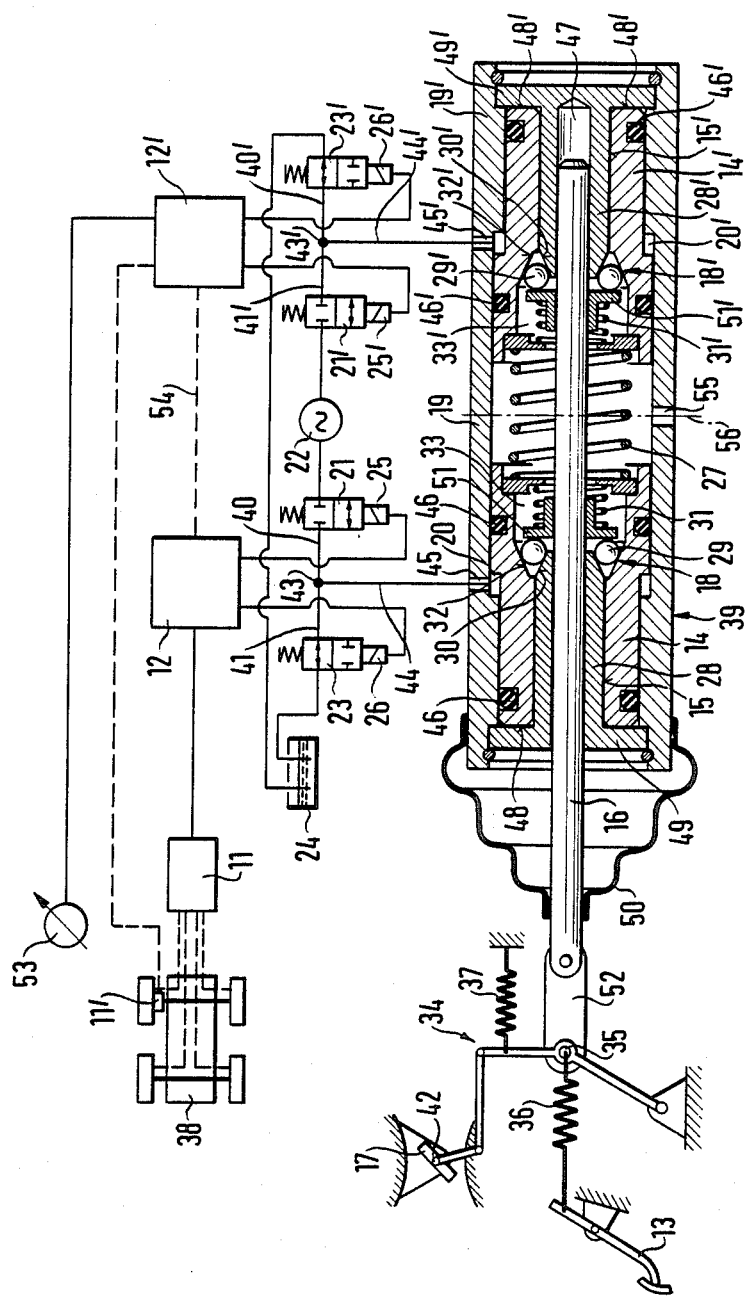

CRUISE CONTROL DEVICE FOR AUTOMOTIVE VEHICLES

BACKGROUND OF THE INVENTION

The present invention relates to a cruise control device for automotive vehicles of the type including an actual speed sensor for determining the actual speed of the vehicle a target speed regulator which can be set to the desired target speed of the vehicle, to be maintained and a control circuit connected to the sensor and to the target speed regulator. The control circuit actuates the accelerator pedal controlled throttle valve of the vehicle engine in a manner for keeping the vehicle speed constant, whereas the accelerator pedal can increase the cruise control to higher speeds than the set target speed as required.

Heretofore, electric motors have been used to set the throttle valve to attain proper cruise control.

SUMMARY OF THE INVENTION

The object of the present invention is to use a hydraulic control element, to position the throttle valve while avoiding constant circulation of hydraulic fluid.

The object is achieved according to the present invention by providing in parallel to the accelerator pedal a piston rod arranged inside a stepped piston having an axial through bore. The piston rod is connected to the throttle valve and is axially coupled through an axial locking mechanism, in the form of a ball-type locking mechanism, with the stepped piston. The stepped piston is pressurized via a control circuit in such a way that the piston rod is driven by the stepped piston, and displaces the throttle valve in an opening direction when an actual speed sensor senses a decrease of vehicle speed below a target speed. The throttle valve is actuated in the opening direction by the control piston which drives the piston rod by way of the ball-type locking mechanism as the speed falls below the set target speed. When the target speed is reached or exceeded, the control circuit depressurizes the stepped piston and a readjusting spring associated with the throttle valve actuating linkage returns the piston rod and the stepped piston back to the rest position. The axial locking mechanism, however, allows the cruise control to be overridden at any time by actuation of the accelerator pedal, since the piston rod moves relative to the stepped piston in the manner of a free-wheel. In the rest position of the stepped piston, the axial locking mechanism is released so that, for example, when the cruise control is switched off, normal actuation of the accelerator pedal in both directions is possible without hindrance from the stepped piston.

An advantageous feature of the invention provides for the stepped piston to be arranged in a stepped cylinder and an annular pressure chamber between the stepped piston and the stepped cylinder is connected via an opening valve to a pressure source and via a closing valve to a supply reservoir. The opening valve and the closing valve are actuated by electromagnets which are controlled by the control circuit. The stepped piston is prestressed towards its rest position against the hydraulic force by a readjusting spring.

According to a preferred embodiment of the present invention, the axial locking mechanism is so designed that the ball-type locking mechanism includes a sleeve arranged in a fixed position relative to the cylinder in the axial bore of the stepped piston. A cone-type taper is provided at the front side of the stepped piston facing balls which are arranged around the position rod. The balls are pressed in the rest position of the stepped piston against the taper by an auxiliary spring which is supported on the stepped piston and are moved away from the position rod against a cone-type enlargement at the circumference of a frontal cavity provided in the stepped piston.

In order to ensure that the stepped piston is readjusted after a control action by application of pressure, a readjusting spring is provided for the accelerator pedal, which spring also acts upon the piston rod in a readjusting manner.

In order to precisely define the rest position of the stepped piston, another feature provides that the readjusting spring is clamped between the stepped piston and a protective cap.

In order to ensure movement of the stepped piston in both directions with as little resistance as possible, the invention provides that the cylinder chambers at both sides of the stepped piston are ventilated to the atmosphere.

The invention is used in combination with a traction slip control device with a sensor reacting to slip of the driven wheels. The sensor actuates the throttle valve at the vehicle motor through a control circuit in such a manner as to reduce the motor drive power and thus decrease the slip action, thereby overriding the accelerator pedal action.

The invention provides for a mechanism of the same type as the cruise control device for additionally providing traction slip control in which mechanism the piston rod extends through an axial bore of a second stepped piston and which can be axially coupled through a second normally released axial ball-type locking mechanism, with the second stepped piston. The stepped piston of the traction control device is pressurized by way of the control circuit in such a way that the piston rod is driven by the second stepped piston and displaces the throttle valve in a closing direction against the force acting upon the accelerator pedal when the sensor senses the beginning of a wheel slip action. The cruise control is shut off during slip control action by means of an overriding connection between the two control circuits. The same piston rod is thus pressurized simultaneously by two stepped pistons, each with separate axial locking devices.

As in the cruise control device, the invention provides in the traction slip control device that the second stepped piston be arranged in a second stepped cylinder and a second pressure chamber is formed between the stepped piston and the stepped cylinder. The second chamber is connected via a second opening valve to a pressure source and via a second closing valve to a supply reservoir. The second opening valve and the second closing valve are actuated by electromagnets which are controlled by the control circuit.

Advantageously, the second stepped piston of the braking control device is prestressed towards a rest position by a readjusting spring.

In the traction slip control device, just as in the cruise control device, the ball-type locking mechanism includes a sleeve arranged in a fixed position relative to the cylinder in the axial bore of the second stepped piston around the piston rod. A cone-type taper is provided at the front side of the second stepped piston facing a plurality of balls arranged around the piston rod. The balls are pressed in the rest position of the stepped piston against the taper by an auxiliary spring supported on the second stepped piston. The balls are moved away from the piston rod, against a cone-type enlargement provided at the circumference of a frontal cavity provided in the stepped piston in the rest position of the second stepped piston.

The rest position of the second stepped piston is defined by a readjusting spring clamped between the stepped piston and a protective cap.

The cylinder chambers at both ends of the second stepped piston are also ventilated toward the atmosphere.

According to an advantageous embodiment, the cruise control device and the traction slip control device form a single unit due to the fact that the two stepped cylinders are combined concentrically to form one double cylinder, with the larger-diameter portions of the two stepped cylinders.

The stepped pistons are arranged with their larger diameter portions axially opposite each other. Thus it is ensured that the one stepped piston moves the throttle valve in the closing direction when pressurized, while the other stepped piston moves the throttle valve in the opening direction when pressurized. Due to these control actions in opposite directions, the assembly of the two devices can be made using a single piston rod.

In case of control devices combined in one double cylinder, it is advantageous for the readjusting spring to be clamped between the two stepped pistons.

BRIEF DESCRIPTION OF THE DRAWINGS

The invention is described hereinafter with reference to the accompanying drawing which is a partial diagrammatic representation of a cruise control device according to the invention shown in combination with a traction slip control device, and a longitudinal cross-section of the hydraulic control element showing details of construction.

DETAILED DESCRIPTION OF THE PREFERRED EMBODIMENT

As shown in the drawing, rotational speed signals from the four wheels of an automotive vehicle 38 are fed to a sensor 11 which transforms the speed signals into a signal indicating the beginning of a slip action of the driving wheels and in turn feeds the signal to a control circuit 12. The control circuit 12 causes pressurization of an opening valve 21 arranged between a pressure source 22 and the hydraulic control element 39 according to the invention. The valve 21 is operated by an electromagnet 25. A closing valve 23 inserted between the hydraulic control element 39 and a supply reservoir 24 is pressurized and operated by an electromagnet 26.

The hydraulic conduits 40, 41 leading from the opening valve 21 and the closing valve 23 to the hydraulic control element 39 are joined at 43 from where a common hydraulic conduit 44 leads to a connecting bore 45 at the circumference of a stepped cylinder 19 which is a component part of the hydraulic control element 39.

Inside the hydraulic stepped cylinder 19, a stepped piston 14 of complementary dimensions is axially slidably arranged and sealed from the stepped cylinder 19 by gaskets 46. Thus hydraulic fluid entering through the bore 45 at the circumference into the annular pressure chamber 20 between the stepped cylinder 19 and the stepped piston 14 cannot penetrate between the stepped piston 14 and the stepped cylinder 19.

To the right of the stepped piston 14, the stepped cylinder 19 is provided with a bore 55 vented to atmosphere. A readjusting spring 27 is arranged symetrically between the stepped piston 14 and a second stepped piston 14'. The readjusting spring 27 is designed as a pressure screw spring which prestresses the stepped piston 14 towards its left-hand end position as viewed in the drawing, where its left-hand front surface 48 abuts against a ring disc 49 fixedly arranged at the cylinder. The ring disc does not seal the stepped cylinder 19 at the left-hand side against pressure.

The stepped piston 14 includes a concentric axial bore 15 through which a sleeve 28 extends in sliding fit from the ring disc 49 with which it is integrally formed as a single unit.

At the side facing away from the front surface 48, the stepped piston 14 includes a concentric frontal cavity 33 which in the area of the annular pressure chamber 20 changes into the axial bore 15 via a cone-type enlargement 32 which widens in the direction from the front side 48 toward the other stepped piston 14'.

Through the circular cylindrical sleeve 28 and the ring disc 49, a piston rod 16 in sliding fit extends beyond the right end of the stepped piston 14. To the left, the piston rod 16 extends through an elastic dust boot 50 sealingly slipped onto the left end of the stepped cylinder 19.

The right end of the sleeve 28 includes a cone-type taper 30 radially opposite the enlargement 32 at the inner circumference of the stepped piston 14. A plurality of small balls 29 are arranged around the piston rod 16 in the area of the cone-type taper. At that side of the balls 29 facing away from the taper 30 a stop ring 51 is provided which is pushed in the direction of the balls 29 by an auxiliary spring 31 supported at the stepped piston 14. In this manner a ball-type locking mechanism 18 is formed.

The auxiliary spring 31 pushes the balls outward by means of the stop ring 51 along the taper 30 until they are stopped at the inner enlargement 32 of the stepped piston 14. At this stage, at which the stepped piston 14 is in the rest position as illustrated in the drawing, the ball-type locking mechanism 18 is opened and the piston rod 16 can move freely in both directions within the sleeve 28.

The end of the piston rod emerging at the left-hand side from the ring disc 49 is connected via a guide bar 52 with the actuating linkage 34 for the throttle valve 17 of the vehicle 38. The throttle valve is tiltingly arranged at the carburetor by means of a joint 42.

The accelerator pedal 13 is hinged at the bulkhead of the vehicle. The pedal pressurizes the actuating linkage 34 via a compensating spring 36 in such a way that the throttle valve 17 tilts in the opening direction as the accelerator pedal 13 is pressed down(to the right in the drawing).

Behind the compensating spring 36, the guide bar 52 which is connected with the piston rod 16 is coupled to the actuating linkage 34 which is prestressed towards its rest position by means of a readjusting spring 37 supported at the chassis of the vehicle.

To the right of the center plane 56, which is at a right angle to the cylinder axis, a second stepped cylinder 19' is arranged symmetrically to the stepped cylinder 19. The second stepped cylinder also includes a second stepped piston 14' symmetrical to the stepped piston 14.

The piston rod 16 extends through the stepped piston 14 deeply into the axial bore 15' of the second stepped piston 14', where again between the axial bore 15' and the piston rod 16 there is arranged a circular cylindrical sleeve 28' which, however, is closed at the right end where it forms a ring disc 49'. Between the end of the piston rod 16 and the right end of the sleeve 28' there is a distance 47 sufficiently large to allow the relative displacements between the piston rod 16 and the sleeve 28' necessary in operation to take place unhindered.

Between the piston rod 16 and the stepped piston 14' there is provided another ball locking mechanism 29', 30', 31', 32', 51'.

The reference numbers with a prime shown in the drawing designate parts of like design and function as the same reference numbers without prime and the components designated by reference numbers with prime are merely arranged symmetrically to the components with the same reference numbers without prime which are arranged to the left of the center plane 56.

The pressure chamber 20' of the stepped cylinder 19' is connected by a hydraulic conduit 44' and a branch point 43' through hydraulic conduits 40' and 41' to an opening valve 21' and a closing valve 23', respectively, of which the actuating electromagnets 25' and 26' are connected to a second control circuit 12'. The inputs to the electromagnets 25', 26' in turn are connected to a target speed regulator 53 actuatable by the driver and to an actual speed sensor 11' of the vehicle. In addition, the control circuit 12' is interconnected with the control circuit 12 via an overriding connection 54.

The mode of operation of the above-described combined cruise control and traction slip control device is as follows:

When no wheel slip occurs, the stepped piston 14 is in its rest position as illustrated in the drawing. The piston rod 16 can move freely in both directions inside the sleeve 28 and the accelerator pedal 13 controls the throttle valve 17.

When slip action of the drive wheels of the vehicle 38 is sensed by the sensor 11, the control circuit 12 in cooperation with the electromagnets 25, 26 causes the opening valve 21 to open and the closing valve 23 to close, which causes a hydraulic pressure to be built up in the annular pressure chamber 20. The pressure displaces the stepped piston 14 towards the right as shown in the drawing. In this process, the circumferential surface of the enlargement 32 moves the balls 29 somewhat to the right and eventually pushes them radially inward against the piston rod 16 while the stop ring 51 slightly compresses the auxiliary spring 31. Accordingly, the ball-type locking mechanism 18 is locked due to the bevelling of the enlargement 32. As the stepped piston 14 moves further to the right as shown in the drawing, the stepped piston drives the piston rod 16 so that the piston rod 16 actuates the throttle valve 17 in a closing direction by way of the guide bar 52 and the actuating linkage 34. The power to the drive wheels is accordingly reduced. Thus, slip action is eliminated just as it is about to begin. The sensor 11 signals the control circuit 12 which closes the opening valve 21 and opens the closing valve 23, which causes the annular pressure chamber 20 to be connected with the supply reservoir 24 and the readjusting spring 27 to readjust the stepped piston 14 to the rest position as shown in the drawing by forcing the hydraulic fluid out of the annular pressure chamber 20, until the front surface 48 stops at the ring disc 49.

Since the circumferential surface of the enlargement 32 now moves radially away from the balls 29, the auxiliary spring 31 can act on stop ring 51 to move the balls 29 back to the position shown in the drawing to unlock ball-type locking mechanism 18.

It is essential that, while the ball-type locking mechanism 18 is in the locked position, the piston rod 16 can be moved further to the right as viewed in the drawing by the action of the readjusting spring 37, because the ball-type locking mechanism 18 operates only in one direction in the manner of a free-wheel.

During a traction slip control action, it is ensured by means of the overriding connection 54 that the second control circuit 12' keeps the closing valve 23' open so that the pressure chamber 20' communicates with the supply reservoir 24 and thus the second stepped piston 14' reaches the rest position shown in the drawing, whereat the ball-type locking mechanism including the balls 29' is open. The piston rod 16, therefore, can move freely within the second stepped piston 14' and the slip control action taking place in the stepped cylinder 19 is not hindered.

During normal driving over long distances, the driver can set the target speed regulator 53 to a predetermined speed. This can also be effected by the driver by bringing the vehicle to a desired speed and then fixing such speed by means of the target speed regulator 53.

If the determined speed decreases below the desired value, the actual speed sensor 11' indicates this condition and the control circuit 12' closes the closing valve 23' and opens the opening valve 21' so that pressure is fed into the pressure chamber 20' of the stepped piston 14', whereupon the second stepped piston 14' moves to the left as viewed in the drawing. As this happens, the ball-type locking mechanism locks and the piston rod 16, which is accordingly moved toward the left so that the throttle valve 17 is opened further and the vehicle accelerates. As the target speed is reached the closing valve 23 opens again and the opening valve 21' closes again so that the pressure in the pressure chamber 20' decreases accordingly.

The control circuit 12' must also ensure that at the beginning of cruise control action the stepped piston 14' moves slightly away from its rest position, in order to allow the throttle valve 17 to be controlled not only in case of an undesired decrease, but also in case of an undesired increase of the speed.

Since the left-hand control piston 14 is in its rest position during cruise control, the movement of the piston rod 16 is not hindered in any way by the ball-type locking mechanism with the balls 29.

The present invention thus creates an extremely compact control device which can be economically manufactured and which provides not only traction slip control, but also control of speed relative to a set target speed.

What is claimed is:

1. A cruise control device for automotive vehicles, comprising an actual speed sensor for determining the actual speed of the vehicle, a target speed regulator which can be set to the target speed of the vehicle, a speed control circuit connected to the actual speed sensor and to the target speed regulator, said speed control circuit actuates an accelerator pedal-operated throttle valve associated with a vehicle engine in a manner for keeping the vehicle speed constant, said accelerator pedal adapted to increase the vehicle speed to speeds greater than the set target speed, a piston rod connected in parallel to the accelerator pedal, said piston arranged inside a first stepped piston in an axial through bore in the stepped piston, said piston rod axially releasably coupled with the first stepped piston through an axial ball-type locking mechanism which is released in the rest position of the first stepped piston wherein the piston rod moves freely in the bore in the stepped piston said stepped piston pressurized by fluid pressure through the speed control circuit, said piston rod being driven by the first stepped piston and displacing the throttle valve in an opening direction when the actual speed sensor senses a decrease of vehicle speed below the target speed.

2. The device as defined in claim 1, wherein the first stepped piston is arranged in a first stepped cylinder and a first annular pressure chamber is disposed between the first stepped piston and the first stepped cylinder, said first pressure chamber connected by way of a first opening valve to a pressure source and by way of a first closing valve to a supply reservoir, said first opening valve and said first closing valve each being actuated by electromagnets, said electromagnets being controlled by the speed control circuit.

3. The device as defined in claim 1, wherein the first stepped piston is prestressed towards the rest position by a readjusting spring.

4. The device as defined in claim 2, wherein the ball-type locking mechanism includes a sleeve arranged in a fixed position relative to the first stepped cylinder, said sleeve disposed in the axial bore of the first stepped piston and around the piston rod said sleeve including a first cone-type taper provided at a front side thereby facing a first plurality of balls arranged around the piston rod, said first plurality of balls being pressed in the rest position of the first stepped piston against said first taper by a first auxiliary spring supported on the first stepped piston, said first plurality of balls further pressed against a first cone-type enlargement provided at the circumference of a frontal cavity provided in the first stepped piston.

5. The device as defined in claim 1, further including a readjusting spring connected to the accelerator pedal linkage, said spring acts on the piston rod in a direction for biasing said piston rod toward the rest position.

6. The device as defined in claim 1, wherein the piston rod extends through a bore in a hydraulic control unit first closing member, said first closing member being a first ring disc at a front side of the hydraulic control element proximate an accelerator pedal actuating linkage.

7. The device as defined in claim 6, wherein a second ring disc is arranged in the stepped cylinder at a side of the hydraulic control element opposite said front side.

8. The device as defined in claim 7, wherein the readjusting spring is clamped between the first stepped piston and the first ring disc.

9. The device as defined in claim 2, wherein the stepped bore is ventilated to atmosphere at a side of the first stepped piston opposite said annular pressure chamber.

10. The device as defined in claim 1, further comprising traction slip control means including a sensor reacting to the start of a slip of driven wheels of the vehicle, said sensor actuates the throttle valve of the engine through a traction control circuit to reduce drive power from said engine thereby decreasing the slip action of said driven wheels, said traction slip control overrides the accelerator pedal, said piston rods extends through an axial bore in a second stepped piston, said piston rod axially coupled by way of a second balltype axial locking mechanism, said piston rod is released in the rest position of the second stepped piston wherein the piston rod moves freely in the axial bore in the second stepped piston, said second stepped piston being pressurized with hydraulic fluid by way of the traction control circuit in such a way that the piston rod is driven by the second stepped piston and displaces the throttle valve in a closing direction against an external force acting upon the accelerator pedal when the sensor senses said start of said slip action, said cruise control being deactivated by an overriding connection between the speed control circuit and the slip control circuit.

11. The device as defined in claim 10, wherein the second stepped piston is arranged in a second stepped cylinder and a second annular pressure chamber is formed between the second stepped piston and the second stepped cylinder is connected via said second pressure chamber, a second opening valve to the pressure source and via a second closing valve to said supply reservoir, said second opening valve and the second closing valve being actuated by two additional electromagnets controlled by the slip control circuit.

12. The device as defined in claim 10, wherein the second stepped piston is prestressed towards the rest position by a readjusting spring.

13. The device as defined in claim 11, wherein the second ball-type locking mechanism includes a second sleeve arranged in a fixed position relative to the second stepped cylinder in the axial bore of the second stepped piston and around the piston rod, said second sleeve having a second cone-type taper provided at a front side thereof facing a second plurality of balls arranged around the piston rod, said second plurality of balls being pressed in the rest position of the second stepped piston against said second taper by a second auxiliary spring supported on the second stepped piston and against a second cone-type enlargement at the circumference of a frontal cavity provided in the second stepped piston.

14. The device as defined in claim 10, wherein the piston rod extends straight through both said first stepped piston and said second stepped piston.

15. The device as defined in claim 10, where the first ring disc is an integral part of the second sleeve.

16. The device as defined in claim 12, wherein the readjusting spring is clamped between the first stepped piston and the second stepped piston.

17. The device as defined in claim 11, wherein the two stepped cylinders define one double cylinder, with the larger-diameter portions of the two stepped cylinders forming a central chamber between the two stepped pistons.

18. The device as defined in claim 17, wherein the central chamber between said first and second stepped pistons is vented to the atmosphere.

19. The device as defined in claim 17, wherein the stepped pistons are arranged with their larger diameter portions axially opposite each other.

20. The device as defined in claim 7, wherein the second ring disc is a closed member.

21. The device as defined in claim 5, further including a compensating spring at a coupling point of the piston rod to an actuating linkage so that any tensile force of said compensating spring is overcome by hydraulic pressurization of said stepped piston when said accelerator pedal is depressed.

* * * * *